US011941135B2

(12) United States Patent
Sofer et al.

(10) Patent No.: US 11,941,135 B2
(45) Date of Patent: Mar. 26, 2024

(54) AUTOMATED SENSITIVE DATA CLASSIFICATION IN COMPUTERIZED DATABASES

(71) Applicant: INTERNATIONAL BUSINESS MACHINES CORPORATION, Armonk, NY (US)

(72) Inventors: Oded Sofer, Midreshet Ben Gurion (IL); Guy Gonen, Be'er Sheva (IL); Benazeer Daruwalla, Brooklyn, NY (US)

(73) Assignee: International Business Machines Corporation, Armonk, NY (US)

( * ) Notice: Subject to any disclaimer, the term of this patent is extended or adjusted under 35 U.S.C. 154(b) by 767 days.

(21) Appl. No.: 16/549,580

(22) Filed: Aug. 23, 2019

(65) Prior Publication Data

US 2021/0056219 A1    Feb. 25, 2021

(51) Int. Cl.
  *G06F 21/62*      (2013.01)
  *G06F 16/22*      (2019.01)
  *G06F 16/2457*    (2019.01)
  *G06F 16/28*      (2019.01)

(52) U.S. Cl.
  CPC ...... *G06F 21/6218* (2013.01); *G06F 16/2282* (2019.01); *G06F 16/24578* (2019.01); *G06F 16/285* (2019.01)

(58) Field of Classification Search
  None
  See application file for complete search history.

(56) References Cited

U.S. PATENT DOCUMENTS 8,055,669 B1 * 11/2011 Singhal ............... G06F 16/3322
                                                   707/765
8,407,194 B1    3/2013 Chaput
9,779,260 B1   10/2017 Brisebois
9,785,795 B2   10/2017 Grondin
(Continued)

OTHER PUBLICATIONS

Donghui Yan et al., Fast Approximate Spectral Clustering, dated Jun. 2009, AMC digital library, pp. 1-9, downloaded from the Internet on May 18, 2022, URL: https://dl.acm.org/doi/abs/10.1145/1557019.1557118 (Year: 2009).*

(Continued)

*Primary Examiner* — Harunur Rashid
(74) *Attorney, Agent, or Firm* — Daniel J. Hakimi (57) ABSTRACT

Automated classification of sensitive data in a database, which includes: Retrieving a catalog of a database. Sampling record values from at least some of the columns. Generating a map of probable associations between different columns of tables of the database. Applying a machine learning classifier to the sampled record values, to classify the columns of the sampled records into multiple data classes, some being sensitive data classes. Classifying columns of non-sampled record values according to the classification of the sampled record values, based on the map. Searching all objects of the database for existence of record values of the classified columns, to output value and field name pairs. Scoring the pairs according to a measure of their repetitiveness in the output. Increasing the score of the pairs whose field names are similar. Based on the scores, indicating which fields of the database are likely to include sensitive data.

12 Claims, 5 Drawing Sheets

(56) References Cited

U.S. PATENT DOCUMENTS

| | | | |
|---|---|---|---|
| 10,505,825 B1* | 12/2019 | Bettaiah | G06F 16/285 |
| 2005/0240614 A1* | 10/2005 | Barsness | G06F 16/2462 |
| | | | 707/999.102 |
| 2010/0169348 A1* | 7/2010 | Maro | G06F 16/24556 |
| | | | 707/E17.014 |
| 2017/0004157 A1* | 1/2017 | Varadarajan | G06F 16/221 |
| 2018/0018310 A1* | 1/2018 | Unsal | G06F 40/174 |
| 2018/0174671 A1* | 6/2018 | Cruz Huertas | G16H 10/60 |
| 2018/0232528 A1* | 8/2018 | Williamson | G06N 5/025 |
| 2019/0034767 A1* | 1/2019 | Sainani | G06V 40/1347 |
| 2020/0050966 A1* | 2/2020 | Enuka | G06Q 10/10 |
| 2020/0089394 A1* | 3/2020 | Kondapalli | G06F 40/186 |
| 2021/0019425 A1* | 1/2021 | Ostadzadeh | H04W 12/00 |

OTHER PUBLICATIONS

Mell et al., "The NIST Definition of Cloud Computing", National Institute of Standards and Technology, Special Publication 800-145, Sep. 2011, 7 pages.

\* cited by examiner

AUTOMATED SENSITIVE DATA CLASSIFICATION IN COMPUTERIZED DATABASES

BACKGROUND

The invention relates to the field of automatic data classification.

The recent increase in information privacy regulation worldwide has given rise to various technologies that evaluate computerized databases for compliance with such regulation. In addition, the growth in security attacks on sensitive databases also drives the development of these technologies, so organizations can better secure certain databases.

Such technologies provide risk assessments tools regarding compliance with GDPR, PCI, HIPAA, CCPA, LGPD, and other regulations by using sophisticated data classification techniques, vulnerability scanning, and risk scoring.

These tools help highlight databases containing sensitive data, so organizations gain insights into where they need to focus and prioritize their data security and risk remediation efforts.

One such tool is the Security Guardium Analyzer by IBM Corp., designed to help identify regulated data risks by analyzing on-premises and cloud databases to find and present users with prioritized risk information. It includes a classification engine which searches data inside database tables, performs vulnerability scanning, and uncovers current threats.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

One embodiment relates to a method which comprises: retrieving a catalog of a database, wherein the catalog comprises metadata defining objects of the database, wherein the objects are selected from the group consisting of: tables, columns, synonyms, and views; sampling record values from at least some of the columns; generating a map of probable associations between different columns of the tables of the database, based on: (a) the metadata, and (b) the sampled record values; applying a machine learning classifier to the sampled record values, to classify the columns of the sampled records into multiple data classes, wherein at least some of the data classes are sensitive data classes; classifying columns of non-sampled record values according to the classification of the sampled record values, based on the map of probable associations between the different columns; searching all objects of the database for existence of record values of the classified columns, to output value and field name pairs; scoring the pairs according to a measure of their repetitiveness in the output, wherein a higher repetitiveness produces a higher score and a lower repetitiveness produces a lower score; increasing the score of the pairs whose field names are similar; and based on the scores, indicating which fields of the database are likely to include sensitive data.

Another embodiment relates to a system which comprises: (a) at least one hardware processor; and (a) a non-transitory computer-readable storage medium having program code embodied therewith, the program code executable by said at least one hardware processor to perform the steps of the method.

A further embodiment relates to a computer program product for automated sensitive data classification, the computer program product comprising a non-transitory computer-readable storage medium having program code embodied therewith, the program code executable by at least one hardware processor to perform the steps of the method.

In some embodiments, the sampling is of 2-10 record values from each of the columns.

In some embodiments, the sampling comprises ignoring record values that are at least one of: null, blank, zero, Boolean, and strings shorter than a predefined length.

In some embodiments, the sampling comprises removing at least one of a prefix and a suffix from the sampled record values.

In some embodiments, the machine learning classifier is trained on a dataset that comprises values that are manually labeled as sensitive or non-sensitive.

In some embodiments, the repetitiveness is measured by applying at least one of a Shell sort algorithm and a Bloom filter to the pairs.

In some embodiments, the field names are determined to be similar using at least one of: a stemming algorithm, and a natural-language understanding (NLU) algorithm.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Disclosed herein is a method, system, and computer program product for automated classification of sensitive data types in databases. The disclosed classification technique is designed to quickly and accurately locate sensitive data types in extremely large databases, based on locating repetitive (also "duplicate") data and data types in the database; this redundancy serves as a hint for the correctness of the classification, and is also an efficient manner of traversing those extremely large databases.

The term "sensitive data" or "sensitive data type," as used herein, may refer to information that can be used to distinguish or trace a person's identity, such as, but not limited to: name, social security number, government ID number, driver's license number, date and place of birth, mother's maiden name, telephone number, email address, IP (Internet Protocol) address, residential address, and biometric record. The term may also refer to other information that is linked or linkable to a person, such as this person's medical, educational, financial, and employment information.

Since sensitive data obtained via a database breach may be used for criminal acts such as identity theft, it is of utmost importance to an organization to be able to identify where such data is stored, so that greater security resources can be allocated to protect it from breaches. In some cases, regulation even prescribes that such sensitive data can only be physically stored in some locations but not in others—and the organization needs to know if the introduction of new sensitive data into its databases suddenly triggers the need to physically relocate a database (or to delete the data).

Figure 1:
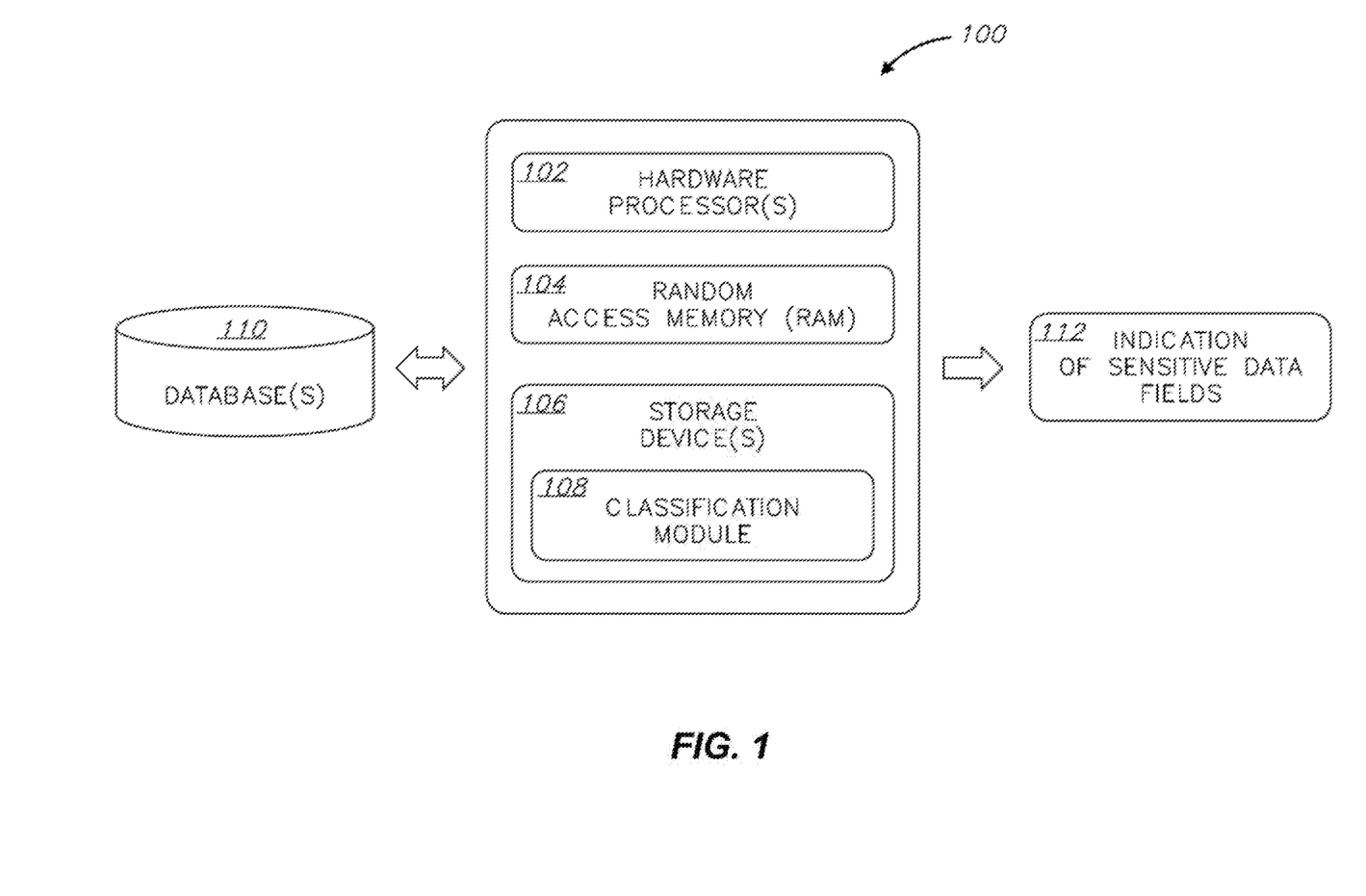
FIG. 1 is a block diagram of an exemplary system for automated classification of sensitive data types, according to an embodiment.

Reference is now made to FIG. 1, which shows a block diagram of an exemplary system 100 for automated classification of sensitive data types, according to an embodiment. System 100 may comprise one or more hardware processor(s) 102, random-access memory (RAM) 104, and one or more non-transitory computer-readable storage device(s) 106.

Storage device(s) 106 may have stored thereon software instructions or components configured to operate a processing unit (also "hardware processor," "CPU," or simply "processor"), such as hardware processor(s) 102. In some embodiments, the software components may include an operating system, having various software components and/or drivers for controlling and managing general system tasks (e.g., memory management, storage device control, power management, etc.), and facilitating communication between various hardware and software components. In some embodiments, the program instructions are segmented into one or more software modules, which may include, e.g., a classification module 108.

System 100 may operate by loading instructions of classification module 108 into RAM 104 as they are being executed by processor(s) 102. The instruction of classification module 108 cause system 100 to: interface with one or more databases, such as database(s) 110, for which classification of sensitive data types is required; classify data types existing in database(s) 110; and output an indication 112 of sensitive data fields existing in database(s) 110.

Figure 3:
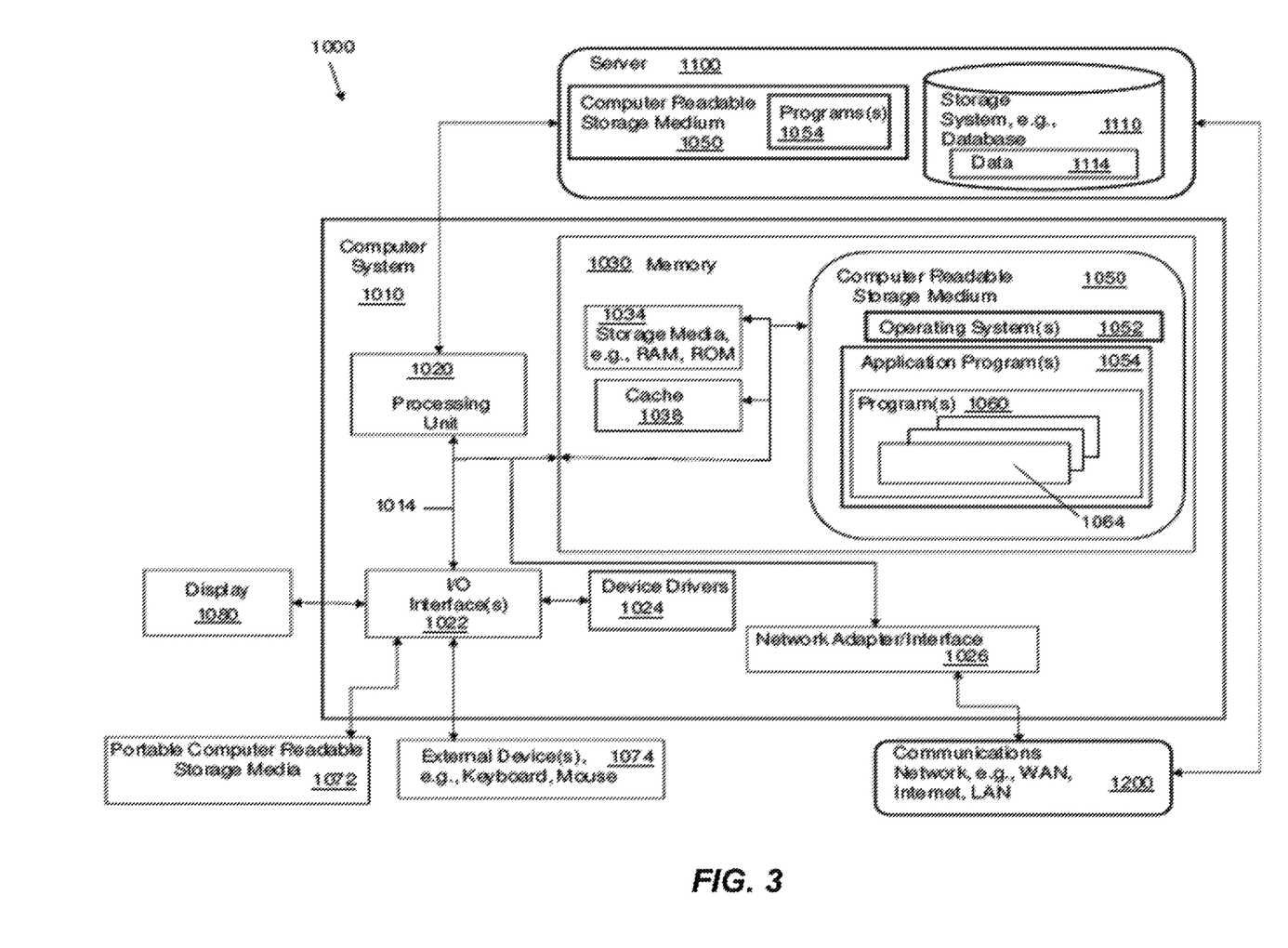
FIG. 3 is a block diagram of a system in accordance with example implementations of the present disclosure.

System 100 as described herein is only an exemplary embodiment of the present invention, and in practice may be implemented in hardware only, software only, or a combination of both hardware and software. System 100 may have more or fewer components and modules than shown, may combine two or more of the components, or may have a different configuration or arrangement of the components. System 100 may include any additional component enabling it to function as an operable computer system, such as a motherboard, data busses, power supply, etc. (not shown). An example computer system is illustrated in FIG. 3. Components of system 100 may be co-located or be distributed (i.e., in a distributed computing architecture).

Figure 2:
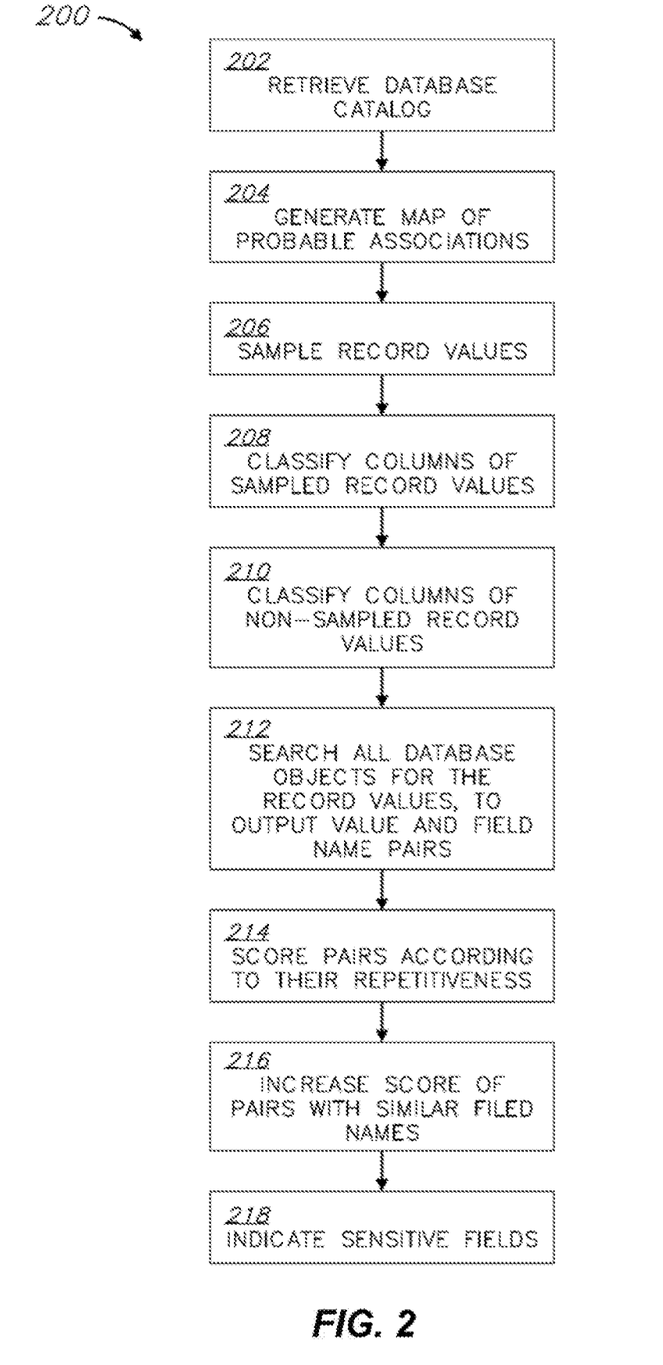
FIG. 2 is a flowchart of a method for automated classification of sensitive data types, according to an embodiment.

The instructions of classification module 108 are now discussed with reference to the flowchart of FIG. 2, which illustrates a method 200 for automated classification of sensitive data types. For simplicity of discussion, method 200 is explained with a reference to a single database whose data types are being classified. However, those of skill in the art will recognize that method 200 may similarly be applied to multiple databases, either sequentially or at the same time (i.e., each step may involve data obtained from multiple databases), such as to multiple different databases maintained by a certain organization and containing either overlapping or distinct data.

Steps of method 200 may either be performed in the order they are presented or in a different order (or even in parallel), as long as the order allows for a necessary input to a certain step to be obtained from an output of an earlier step.

In a step 202, a catalog of a database is retrieved. The catalog, sometimes referred to in the art as an "information schema", includes metadata defining objects of the database, such as tables (and their columns), synonyms, views, indices, and users. The catalog may be retrieved by manually, or more advantageously—automatically, connecting to the database over a computer network, and executing one or more commands such as the "SELECT . . . FROM information_schema.<object>" command of SQL databases, the "SHOW" command of MySQL databases, the "DESCRIBE" command of Oracle SQL Plus databases, or the "\d" command of PostgreSQL databases, to name a few examples.

The metadata included in the retrieved catalog may define, for example, a data type of each column, such as numeric (e.g., bit, tinyint, smallint, int, bigint, decimal, numeric, float, real), date/time (e.g., Data, Time, Datetime, Timestamp, Year), character/string (e.g., Char, Varchar, Text), unicode character/string (e.g., NChar, NVarchar, NText), binary or Boolean (e.g., Binary, Varbinary, image), and/or miscellaneous (e.g., Clob, Blob, XML, JSON), as known in the art. The metadata may also define an allowed length of values stored in each column, which length is given either as a number of characters or as a number of memory units (e.g., bits or bytes).

In a step 204, a map of probable associations between different columns of the tables of the database may be automatically generated, based on: (a) the metadata from the catalogue, retrieved in the preceding step 202, and/or (b) sampled values of records from the different columns of the tables of the database; this sampling may be performed in a similar manner to the sampling discussed in the next step, 206. Optionally, the sampling of step 206 is performed prior to step 204, so that its sampled record values can be used both in step 204 and in step 208.

The generation of the map is based on the notion that certain types of columns could, theoretically, store the same type of sensitive information even if they have somewhat different names, different data types, and/or different lengths of the values they store. Accordingly, in the generation of the map, similarity of names, data types, and lengths of columns (whether in their metadata or real, stored values) is checked. For example, a "Phone" column may be determined to be associated with a "Cell" column even though their names are different; as a further example, these two columns be associated even if one is of the type "number" and the other is a "string", if the real, stored values of the string turn out to be numbers (or numbers with punctuation marks such as hyphens, dots, or parentheses).

The sampled record values may be used in cases where the metadata, such as column names, fail to reliably identify the data type in the column. For example, a column named "Started_at" may store times, even though its name does not include the word "time", and its data type (obtained from the catalog) may not be date/time but rather "string." Optionally, step 204 automatically checks, for each column, which of the metadata and sampled record values yields the most associations with other columns, and generates the map based on that one.

In order to expedite the map generation, the following rule set, or a similar rule set, may be used to quickly rule out improbable associations between the different columns:
1. Date/time-type columns will not be associated with Boolean-type columns.
2. Date/time-type columns will not be associated with number-type columns (although a check of the real stored data may be made to verify, for example, that it does not reflect a Unix data or time).
3. Columns of vastly different lengths will not be associated with each other. For example, columns whose relative lengths are beyond a ratio of 1:1.5, 1:2, or more—will not be associated.

In a step 206, values of records (also "rows") from at least some of the columns of the database (up to all the columns) may be automatically sampled. Optionally, the sampling is of a relatively small number of record values per column, such as only 2-10 or more narrowly only 2-5 record values, in order to save time. Such small number may still allow for reliable classification of sensitive data.

Optionally, in the sampling, record values that are merely noise and do not represent data useful for classification may be automatically ignored. For example, record values that are at least one of: null, blank, zero, Boolean, and strings shorter than a predefined length, may be discarded if incidentally sampled, and substitute record values are sampled instead.

Optionally, the sampling also involves removal of a prefix and/or a suffix from each of the sampled record values, because they similarly introduce unnecessary noise. Prefixes and/or suffixes, as least when they appear in sensitive data, typically represent some redundant information that is attached to various record values but is not sensitive data by itself. For example, some databases (or application servers that connect with databases) automatically add an ID of the computer which added/updated a record to that record, for auditing purposes. As another example, some databases or application servers automatically add a process ID (a unique ID of the database-internal process that was employed to create or update a record) as a prefix to data it stores.

To remove a suffix, one or more of the following automatic approaches may be taken: One is to apply a stemming algorithm or a spelling suggestion algorithm to each record value, to identify the suffix. Another is to check a certain predefined number of the last characters in each record value, and determine if they include a repeating string; this may be reiterated a number of times, every time with a larger number of last characters checked, until a repeating pattern is no longer found, meaning—the beginning of the suffix has been reached.

To remove a prefix, one or more of the following automatically approaches may be taken: One is to apply a stemming algorithm or a spelling suggestion algorithm to each record value, to identify the prefix. Another is to check a certain predefined number of the first characters in each record value, and determine if they include a repeating string; this may be reiterated a number of times, every time with a larger number of first characters checked, until a repeating pattern is no longer found, meaning—the end of the prefix has been reached.

Optionally, the sampled record values are automatically hashed, as known in the art, in order to enhance security and/or ensure compliance with regulation as these values, which are potentially sensitive, are handled by method 200. If such hashing is performed, then the next steps of method 200 are performed on the hash values and not on the sampled values themselves.

Optionally, in order to ensure that the sampled record values are unique, a token-based similarity algorithm may be applied to them (or to their prefix-less/suffix-less versions) to detect duplicates and remove the redundancy. For example, the token-based similarity algorithm may be the "atomic strings" algorithm of Monge, Alvaro E.; Charles P. Elkan (1996). "The Field Matching Problem: Algorithms and Applications". Proceedings of the Second International Conference on Knowledge Discovery and Data Mining (KDD-96). pp. 267-270, or the "WHIRL" algorithm by Cohen, William Weston (1998). "Integration of heterogeneous databases without common domains using queries based on textual similarity". Proceedings of the 1998 ACM SIGMOD International Conference on Management of Data (SIGMOD'98). pp. 201-212.

As mentioned above, step 206 may alternatively be performed prior to step 204, so that the sampled record values can also participate in the generation of the map.

In a step 208, columns of the sampled records may be automatically classified into multiple data classes by applying a machine learning classifier to the sampled record values. At least some of these data classes are sensitive data classes, such as, but not limited to, name, social security number, government ID number, driver's license number, date/place of birth, mother's maiden name, telephone number, email address, IP (Internet Protocol) address, residential address, biometric record, medical information, educational information, financial information, employment information, etc.

The machine learning classifier may be a supervised classifier trained on a dataset that includes values which are manually labeled as sensitive or non-sensitive, as the case may be.

At this point in time, the classification is preliminary and not yet accurate. For example, it may include columns that are false-positively classified as sensitive despite not being such. The next steps of method 200 aim to improve the classification.

Optionally, before progressing the next step, manual input from the user may be received with respect to the accuracy of the classification of step 208. The user may choose, for example, to reassign sampled record values to different classes than what was proposed by the machine learning classifier.

In a step 210, the map of probable associations between the different columns may be used to automatically propagate the classification of columns done in step 208 to columns of other, non-sampled record values. Namely, other columns in the database, which have been determined in step 204 to be associated with the columns classified in step 208, are classified the same as their associated counterparts.

In a step 212, some or all objects (e.g., tables, synonyms, views) of the database may be automatically searched for the existence therein of the same record values of the columns classified in steps 208 and 210. This step aims to locate fields (such as column names, synonyms of column names, view column names, etc.) in optionally the entire database, whose stored data contains the same values as the previously-classified record values. To make this step efficient, the pertinent objects of the database may be retrieved to a computer running method 200 in one (or a few) bulk SQL query, and the search may be performed locally on that computer. This spares the need to run numerous SQL queries for every searched record value.

The output of step 212 may be in the form of value and field name pairs. For example, a pair may be {IBM, Company_Name}, denoting that the value "IBM" was found in a "Company_Name" field in either a table, a synonym, or a view of the database.

Optionally, the pairs are automatically hashed, as known in the art, in order to enhance security and/or ensure compliance with regulation as these pairs, which are potentially sensitive, are handled by method 200. If such hashing is performed, then the next steps of method 200 are performed on the hash values and not on the value and field name pairs themselves.

Optionally, to enhance efficiency, the pairs may be automatically cached in memory (such as in a RAM) using a tool such as Memcached, an open source project originally by Brad Fitzpatrick, or Redis, another open source tool by Redis Labs, Inc.

In a step 214, the pairs may be automatically scored according to a measure of their repetitiveness in the output of the search of step 212. Higher repetitiveness produces a higher score whereas lower repetitiveness produces a lower score. The scores can be on any scale.

The repetitiveness is optionally measured by applying a suitable algorithm to the pairs, such as a Shell sort algorithm and a Bloom filter. Such algorithms, as known in the art, are capable of grouping together identical pieces of data, such that these identical pieces of data can later be easily counted. The count, or a normalized form thereof, may serve as the repetitiveness measure.

Optionally, a lower threshold is used to assign a zero repetitiveness measure to those pairs who repeat only minimally. For example, if each one of a few similar fields includes one million records in the database, then we would expect for some records in these fields to be identical by chance, and not because the fields really store data of the same type. Accordingly, the lower threshold may be set as a percentage of the number of records in the similar field, for example 1%, 5%, 10%, 20% or any value therebetween.

In a step 216, the score of those of the pairs whose field names are similar may be automatically increased. To check for such similarity, a stemming algorithm and/or a natural-language understanding (NLU) algorithm may be applied to the field names, to detect those which share the same stem or the same meaning, respectively.

Following step 216, there exist a large number of value and field name pairs and their scores. In a step 218, the scores may be used for automatically indicating to a user (such as an administrator of the database, a compliance officer, or the like) which specific fields of the database are likely to include sensitive data. The higher the score of a pair—the higher the confidence that the field name in it relates to a column in the database which stores sensitive data (either in some or all of its records).

Optionally, a predetermined threshold is used to determine how many field names are indicated to likely include sensitive data. For example, the threshold may be a fixed score value, a percentile score value, a percentile of all database fields, and/or the like.

Optionally, manual input from the use may be received with respect to the accuracy of the indication given in step 218. The user may choose, for example, to reassign field names to different classes, such as move certain field names from a non-sensitive class to a sensitive class, or vice versa. This manual input may be used to improve the accuracy of consecutive runs of method 200.

Notably, for consecutive executions of method 200 on the same database, not all steps must be repeated. Namely, the database may be periodically queried (or be programmed to actively send out information periodically) to check if it includes any new fields that did not exist at the time of the previous execution; then, those relevant steps of method 200 may be carried out only for those new fields and the records stored in association with them.

Referring to FIG. 3, a system 1000 includes a computer system or computer 1010 shown in the form of a generic computing device. The method 200, for example, may be embodied in a program(s) 1060 (FIG. 3) embodied on a computer readable storage device, for example, generally referred to as memory 1030 and more specifically, computer readable storage medium 1050 as shown in FIG. 3. For example, memory 1030 can include storage media 1034 such as RAM (Random Access Memory) or ROM (Read Only Memory), and cache memory 1038. The program 1060 is executable by the processing unit or processor 1020 of the computer system 1010 (to execute program steps, code, or program code). Additional data storage may also be embodied as a database 1110 which can include data 1114. The computer system 1010 and the program 1060 shown in FIG. 3 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in FIG. 3 as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, as shown in FIG. 3, the system 1000 includes the computer system 1010 shown in the form of a general-purpose computing device with illustrative periphery devices. The components of the computer system 1010 may include, but are not limited to, one or more processors or processing units 1020, a system memory 1030, and a bus

1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media 1034 in the form of volatile memory, such as random access memory (RAM), and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method 200 (FIGS. 2a-2b), for example, may be embodied in one or more computer programs, generically referred to as a program(s) 1060 and can be stored in memory 1030 in the computer readable storage medium 1050. For example, the program 1060 can include the classification module 108 described above with reference to FIG. 1. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
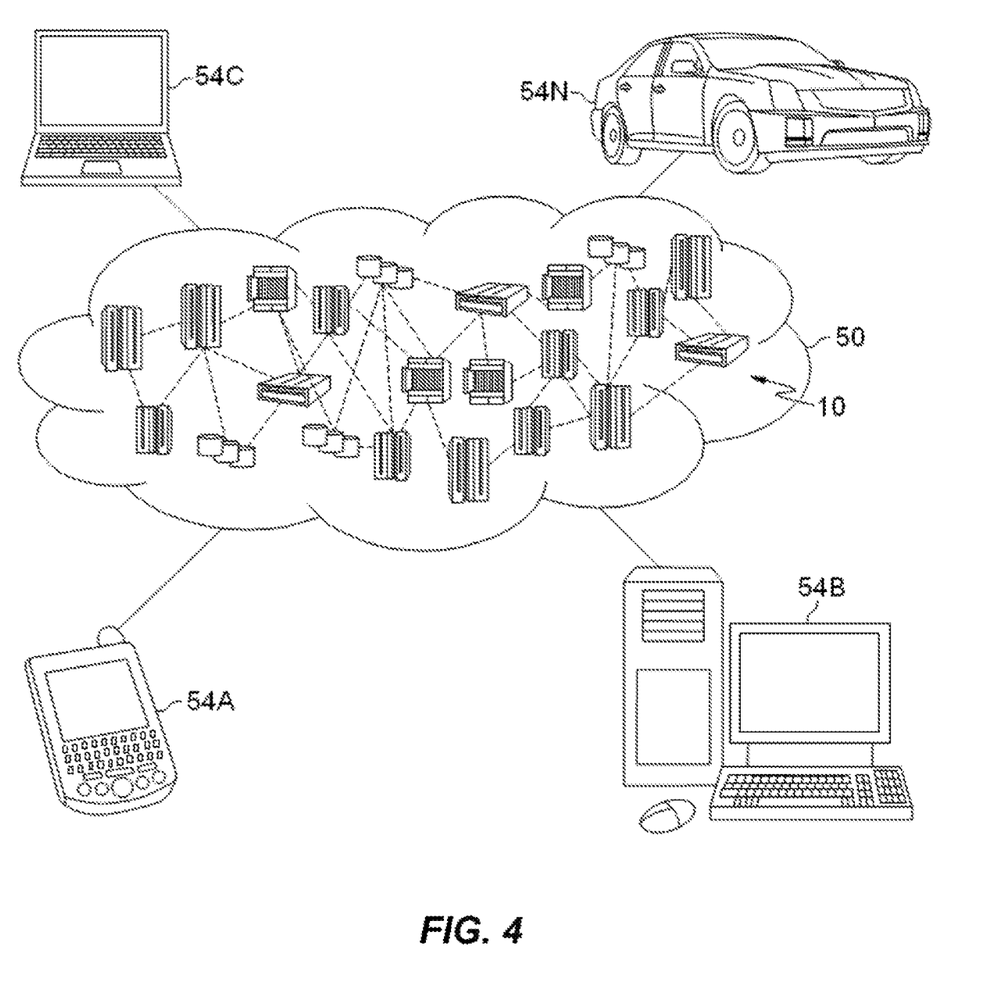
FIG. 4 illustrates a cloud computing environment, in accordance with an embodiment of the invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
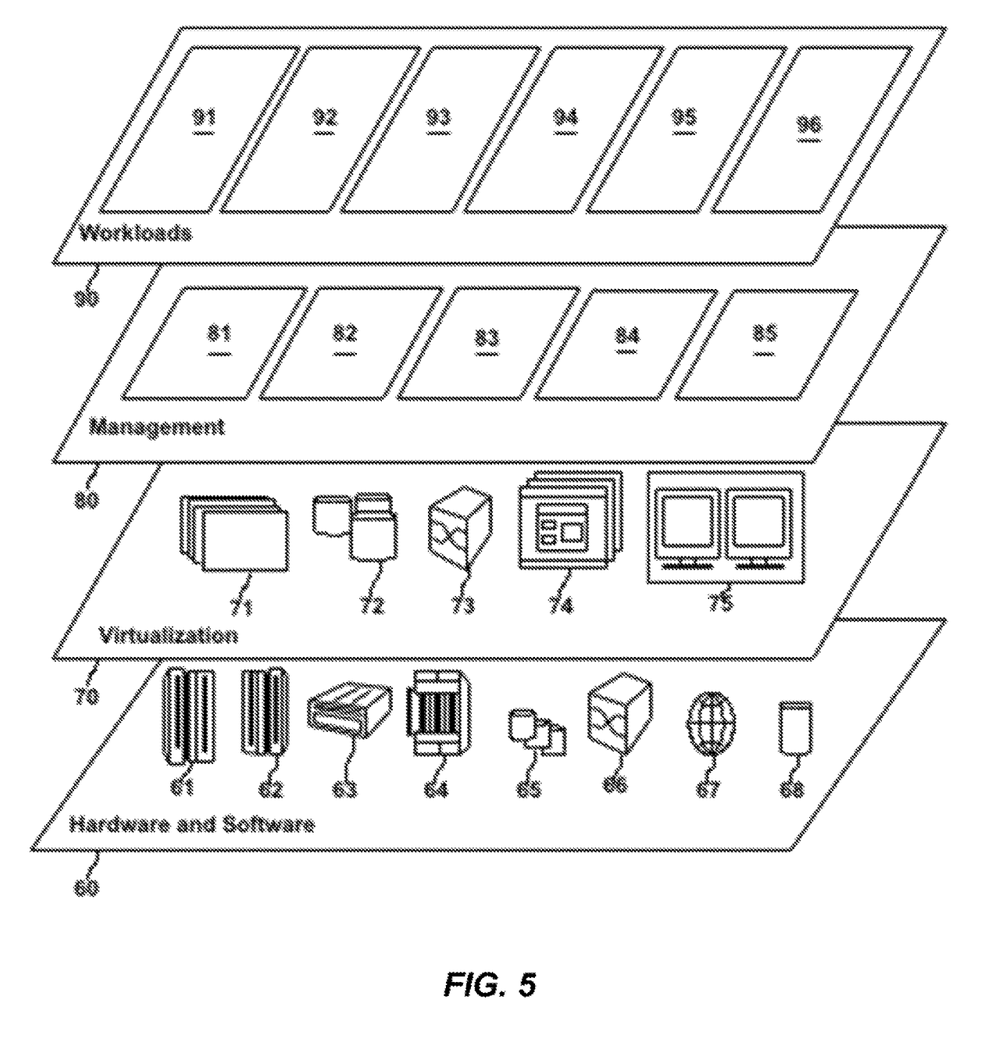
FIG. 5 illustrates a set of functional abstraction layers provided by the cloud computing environment of FIG. 4, in accordance with an embodiment of the invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data classification 96.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The description of a numerical range should be considered to have specifically disclosed all the possible subranges as well as individual numerical values within that range. For example, description of a range from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for automated sensitive data classification, the method comprising:
   retrieving a catalog of a database, wherein the catalog comprises metadata defining objects of the database, wherein the objects include tables and columns;
   sampling record values from at least some of the columns, wherein the sampling comprises ignoring record values selected from a group consisting of: null, blank, zero, Boolean, and strings shorter than a predefined length, and further comprises removing at least one of a prefix and a suffix from the sampled record values through use of a spelling suggestion algorithm;
   generating a map of probable associations between different columns of the tables of the database, based on: (a) the metadata, and (b) the sampled record values;
   applying a machine learning classifier to the sampled record values, to classify the columns of the sampled records into multiple data classes, wherein at least some of the data classes are sensitive data classes;
   classifying columns of non-sampled record values according to the classification of the sampled record values, based on the map of probable associations between the different columns;
   searching all objects of the database for existence of record values of the classified columns, to output value and field name pairs;
   scoring the pairs according to a measure of their repetitiveness in the output, wherein the score corresponds to a count of pieces of data, and wherein a higher repetitiveness produces a higher score and a lower repetitiveness produces a lower score;
   increasing the scores of the pairs whose field names are similar, wherein the field names are determined to be similar using at least one of: a stemming algorithm and a natural-language understanding (NLU) algorithm; and
   based on the scores of the pairs, indicating which fields of the database are likely to include sensitive data.

2. The method according to claim 1, wherein the sampling is of 2-10 record values from each of the columns.

3. The method according to claim 1, wherein the machine learning classifier is trained on a dataset that comprises values that are manually labeled as sensitive or non-sensitive.

4. The method according to claim 1, wherein the repetitiveness is measured by applying at least one of a Shell sort algorithm and a Bloom filter to the pairs.

5. A system for automated sensitive data classification a computer system comprising, a processor, a computer readable storage medium, and program instructions stored on the computer readable storage medium being executable by the processor to cause the computer system to:
   retrieve a catalog of a database, wherein the catalog comprises metadata defining objects of the database, wherein the objects include tables and columns;
   sampling record values from at least some of the columns, wherein the sampling comprises ignoring record values selected from a group consisting of: null, blank, zero, Boolean, and strings shorter than a predefined length, and further comprises removing at least one of a prefix and a suffix from the sampled record values through use of a spelling suggestion algorithm;
   generate a map of probable associations between different columns of the tables of the database, based on: (i) the metadata, and (ii) the sampled record values;
   apply a machine learning classifier to the sampled record values, to classify the columns of the sampled records into multiple data classes, wherein at least some of the data classes are sensitive data classes;
   classify columns of non-sampled record values according to the classification of the sampled record values, based on the map of probable associations between the different columns;
   search all objects of the database for existence of record values of the classified columns, to output value and field name pairs,
   score the pairs according to a measure of their repetitiveness in the output, wherein the score corresponds to a count of pieces of data, and wherein a higher repetitiveness produces a higher score and a lower repetitiveness produces a lower score;
   increasing the scores of the pairs whose field names are similar, wherein the field names are determined to be similar using at least one of: a stemming algorithm and a natural-language understanding (NLU) algorithm; and
   based on the scores of the pairs, indicating which fields of the database are likely to include sensitive data.

6. The system according to claim 5, wherein the sampling is of 2-10 record values from each of the columns.

7. The system according to claim 5, wherein the machine learning classifier is trained on a dataset that comprises values that are manually labeled as sensitive or non-sensitive.

8. The system according to claim 5, wherein the repetitiveness is measured by applying at least one of a Shell sort algorithm and a Bloom filter to the pairs.

9. A computer program product for automated sensitive data classification, the computer program product comprising:
- a computer-readable storage medium having program code embodied therewith, the program code executable by at least one hardware processor to:
- retrieve a catalog of a database, wherein the catalog comprises metadata defining objects of the database, wherein the objects include tables and columns;
- sampling record values from at least some of the columns, wherein the sampling comprises ignoring record values selected from a group consisting of: null, blank, zero, Boolean, and strings shorter than a predefined length, and further comprises removing at least one of a prefix and a suffix from the sampled record values through use of a spelling suggestion algorithm;
- generate a map of probable associations between different columns of the tables of the database, based on: (a) the metadata, and (b) the sampled record values;
- apply a machine learning classifier to the sampled record values, to classify the columns of the sampled records into multiple data classes, wherein at least some of the data classes are sensitive data classes;
- classify columns of non-sampled record values according to the classification of the sampled record values, based on the map of probable associations between the different columns;
- search all objects of the database for existence of record values of the classified columns, to output value and field name pairs;
- score the pairs according to a measure of their repetitiveness in the output, wherein the score corresponds to a count of pieces of data, and wherein a higher repetitiveness produces a higher score and a lower repetitiveness produces a lower score;
- increasing the scores of the pairs whose field names are similar, wherein the field names are determined to be similar using at least one of: a stemming algorithm and a natural-language understanding (NLU) algorithm; and
- based on the scores of the pairs, indicating which fields of the database are likely to include sensitive data.

10. The computer program product according to claim 9, wherein the sampling is of 2-10 record values from each of the columns.

11. The computer program product according to claim 9, wherein the machine learning classifier is trained on a dataset that comprises values that are manually labeled as sensitive or non-sensitive.

12. The computer program product according to claim 9, wherein the repetitiveness is measured by applying at least one of a Shell sort algorithm and a Bloom filter to the pairs.

* * * * *